United States Patent Office 3,050,916
Patented Aug. 28, 1962

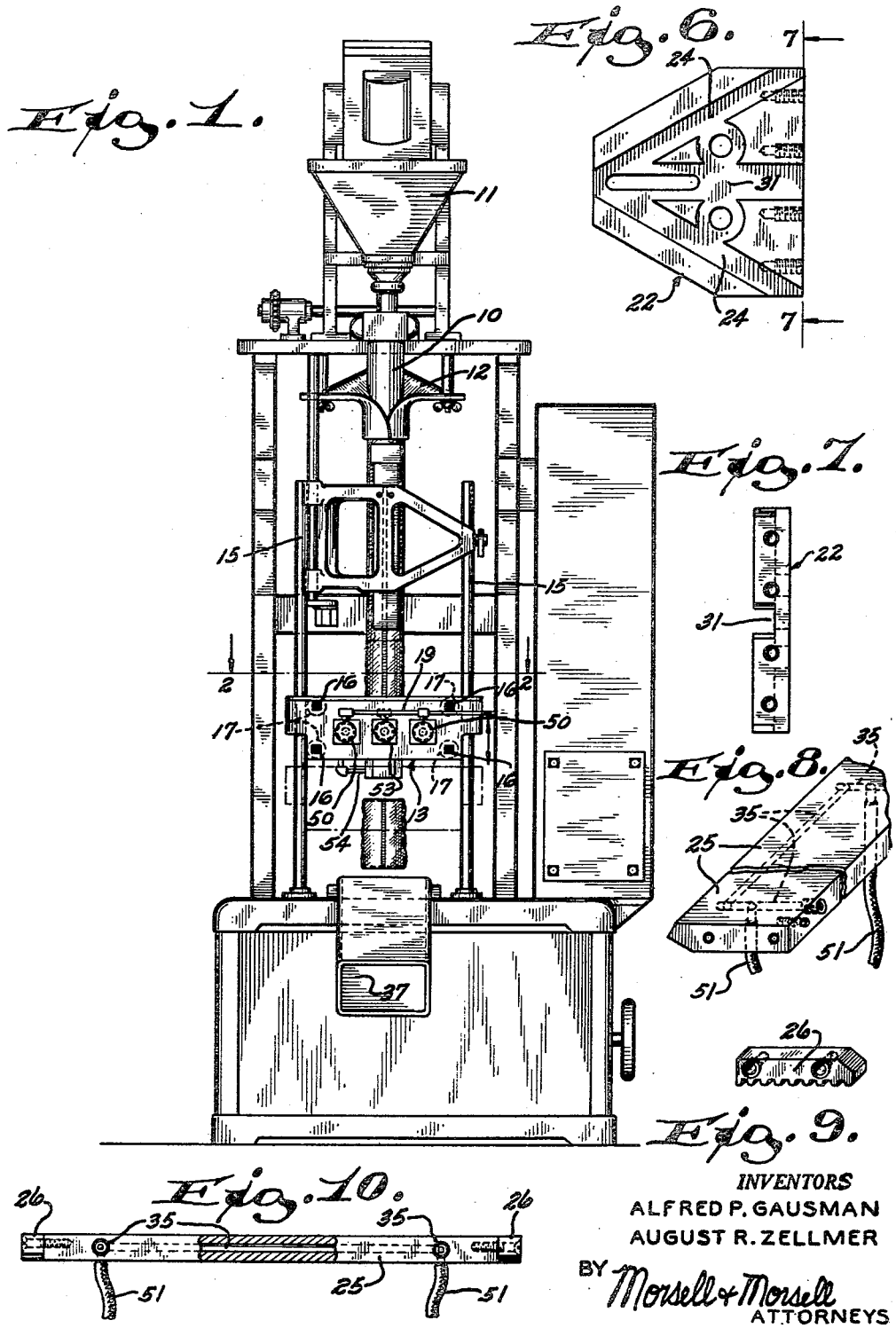

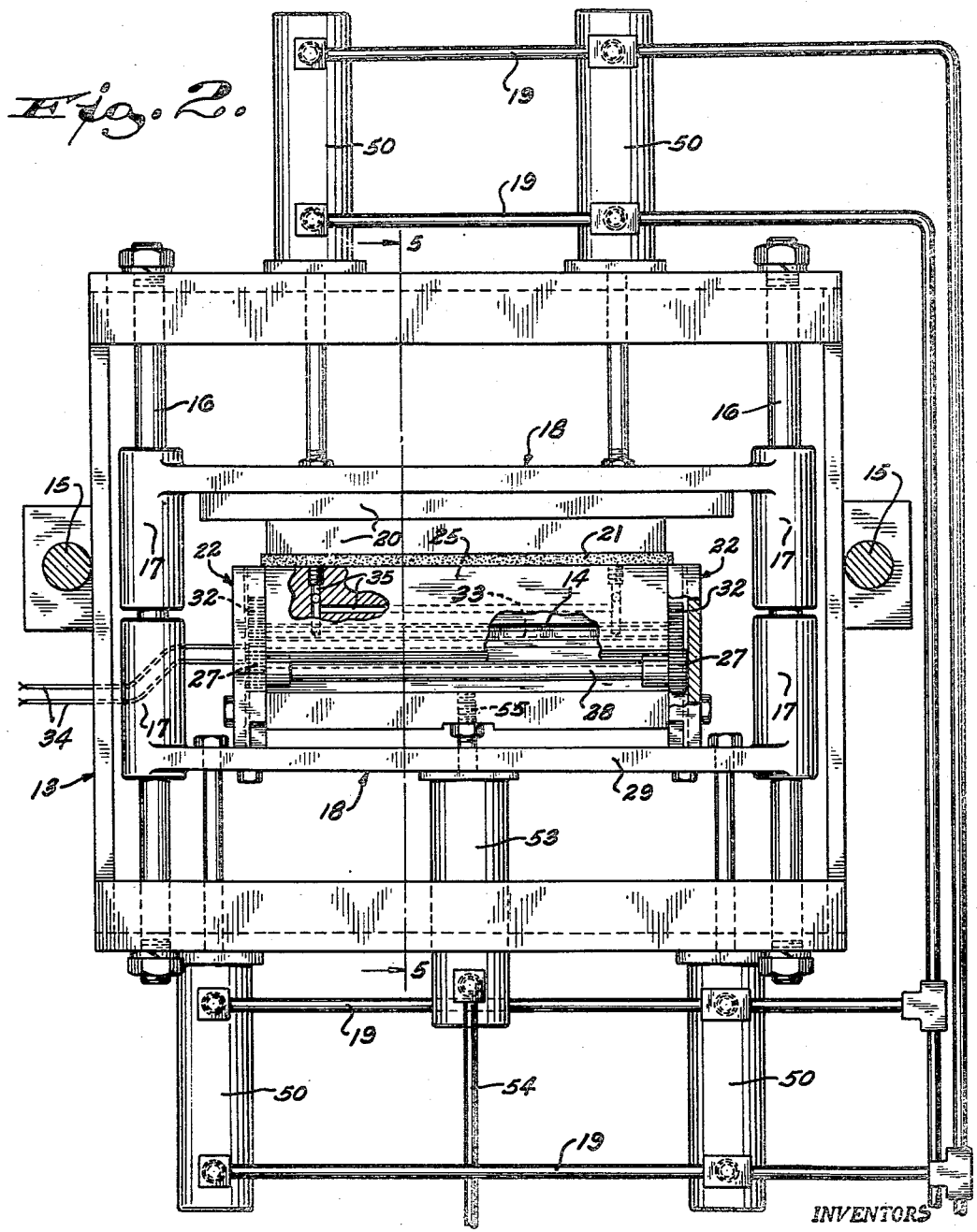

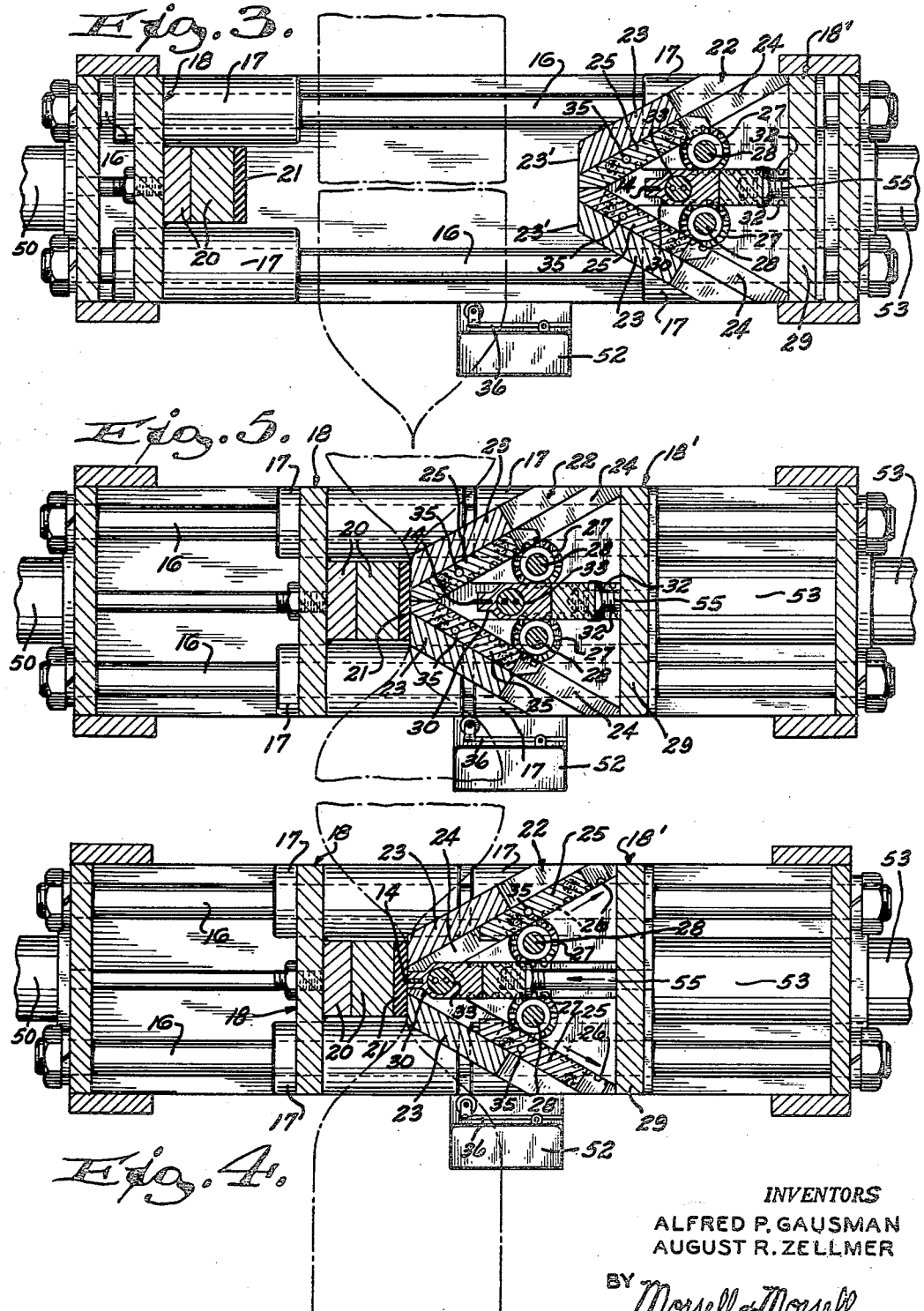

3,050,916
PACKAGING MACHINE FILM SEALING MECHANISM
Alfred P. Gausman and August R. Zellmer, Sheboygan, Wis., assignors to Hayssen Manufacturing Company, Sheboygan, Wis., a corporation of Wisconsin
Filed Apr. 24, 1961, Ser. No. 105,137
12 Claims. (Cl. 53—182)

This invention relates to improvements in packaging machine film sealing mechanisms and more particularly to a packaging machine film sealing mechanism for plastic film material.

Conventional flexible automatic packaging machines cannot operate on such plastic film material for forming the bags or packages as polyethylene or the like without using impulse sealers for the reason that the plastic film material must be cooled under pressure after the heat sealing operation to prevent the sealed portion of the film from separating or becoming undesirably wrinkled.

Impulse sealers, as so used, require considerable maintenance, involve intricate electrical circuits, are expensive to manufacture and install and are not too rapid in their operation.

It is, therefore, the primary object of the present invention to provide, for an automatic packaging machine, a heat sealing mechanism which will efficiently and rapidly operate on various types of plastic film material and eliminate the objections inherent in impulse sealing mechanisms.

A further object of the invention is to provide, in an automatic packaging machine, a heat sealing mechanism for plastic film material which substantially speeds up the package forming operations and which will not permit operation or firing of the heating bar of the sealing mechanism if the die bars are not completely closed as might occur when a piece of the product being packaged wrongfully lodges between the dies, thereby preventing damage to the mechanism as a result of improper operation.

A further object of the invention is to provide a packaging machine sealing mechanism for plastic films wherein, as the dies close in position to perform the cut-off operation, heat is applied to form a transverse seal and melt the film as it is severed, followed by a retraction of the heating bar and cut-off knife and a simultaneous projection onto the sealed film material of cooling bars to quickly cool the sealed area of the film whereby the seal is strengthened so that the bag will hold the product when the dies open.

A further object of the invention is to provide a packaging machine film sealing mechanism which is especially suited for plastic film material and with which a standard flexible automatic packaging machine may be readily equipped for expeditious and efficient operations.

A further object of the invention is to provide a packaging machine sealing mechanism for plastic films which is of relatively simple construction, which is strong and durable, which is automatic and rapid in its operation, and which is well adapted for the purposes described.

With the above and other objects in view the invention consists of the improved packaging machine film sealing mechanism, and its parts and combinations as set forth in the claims, and all equivalents thereof.

In the accompanying drawings in which the same reference characters indicate the same parts in all of the views:

FIG. 1 is a front view of a single tube automatic packaging machine equipped with the improved plastic film sealing mechanism;

FIG. 2 is an enlarged transverse sectional view taken on line 2—2 of FIG. 1;

FIG. 3 is an enlarged vertical fragmentary detail sectional view through the sealing mechanism showing the dies in open position with the parts of the film sealing mechanism retracted;

FIG. 4 is a similar enlarged fragmentary detail sectional view only showing the dies in closed position with the members of the sealing mechanism in projected, film sealing and severing position;

FIG. 5 is a similar enlarged fragmentary detail sectional view showing the knife and heat sealing members of the sealing mechanism retracted but with the cooling bars projected for cooling the sealed film material, said view taken approximately along the line 5—5 of FIG. 2;

FIG. 6 is a detail view of the member in the sealing mechanism which reciprocatably supports the knife and heater and the cooling bars;

FIG. 7 is an end view taken along the line 7—7 of FIG. 6;

FIG. 8 is a fragmentary detail perspective view of an upper reciprocatable cooling bar;

FIG. 9 is a perspective view of one of the rack bars which is carried by and operates a cooling bar; and FIG. 10 is an enlarged detail rear view, with part broken away and in section, of a cooling bar with mounted rack bars on the sides thereof.

The improved film sealing mechanism for automatic packaging machines is adaped to be incorporated in an automatic packaging machine of the type, for instance, shown in the expired Zwoyer Patent No. 1,986,422. As herein shown in FIG. 1, an automatic packaging machine of the type with which the present improvements are incorporated includes a vertical hollow forming tube 10 which is in communication at its upper end with a suitable type of feeding device. The particular type of feeding device for the product to be packaged may be a net weight scale feed, a volumetric feed, or any of the other conventional feed devices well known in the art for measuring and delivering a predetermined quantity of a product to be packaged. The material to be packaged is supplied from a source into the particular type of feeding device with which the machine is equipped and a predetermined amount of the commodity reaches the upper end of the forming tube 10 via a funnel 11 or other conventional means. The bags or packages are in the process of being successively formed below the head of the machine, and flexible sheet materal 12 from which the bags or packages are formed is fed from a roll over certain forming bars and is wrapped about the forming tube 10, as shown in FIG. 1. The wrapped flexible sheet material 12 is provided with a longitudinal seal by means of a conventional longitudinal heat sealing device. Movable end seal dies operate to close and seal the lower end of the tube which is forming a bag so as to retain therein the batch of material with which the bag is packed. Said end seal dies are designated generally by the numeral 13 in FIGS. 1 and 2 and are arranged to reciprocate downwardly from the full line position of FIG. 1 to the broken line position in said view to pull a predetermined extent of the bag forming tube downwardly with them, whereupon the end seal dies release the tube and move upwardly in open position to again close and engage the filled bag forming tube at an upper position, thereby finally closing and sealing the tube portion therebelow to confine a measured batch of the commodity therein. This operation of the end seal dies in the upper position serves to simultaneously seal the lower end of the tube portion thereabove simultaneously with the sealing of the top of the filled bag therebelow. It is conventional to incorporate with the end seal die assembly a cut-off knife 14 which operates to sever a lower filled bag from the bottom of the bag being formed thereabove, which bag had its lower end operated on by the end seal dies, as mentioned immediately above.

While automatic flexible packaging machines of the type shown in the Zwoyer Patent No. 1,986,422 are adapted for use with any of the suitable types of flexible packaging film materials having thermoplastic qualities and which are susceptible of being heat sealed, to adapt such machines for use in connection with certain types of plastic film material such as polyethylene, it has heretofore been necessary to incorporate in the end seal die assemblies, for the transverse seals, so-called "impulse sealers" because the plastic film material must be cooled under pressure to prevent it from becoming gummy. The present invention has as its objective the provision of a very efficient type of sealing mechanism especially adapted for the sealing of plastic film material, which sealing mechanism is simple and maintenance free and is readily incorporated in the end seal die assembly of a conventional automatic flexible packaging machine. The improved sealing mechanism incorporated in the automatic packaging machine of FIG. 1, in association with the end seal dies, is shown in detail in FIGS. 3, 4 and 5. While the machine illustrated is a single tube machine, it should be understood that the present improvements may be readily incorporated in a multiple tube machine.

A flexible automatic packaging machine of the type illustrated in FIG. 1 includes a pair of spaced apart vertical guide posts 15 on which the die assembly 13 is mounted for vertical reciprocations. As is conventional, the die assembly 13 also includes pairs of laterally spaced apart guide rods 16 on which the sleeve portions 17 of the complementary die jaws 18 and 18' are mounted for reciprocation toward and away from one another in a horizontal plane. Conventional fluid pressure means such as air cylinders 50 are associated with the complementary die sections for projecting said sections toward one another and for retracting the same, such fluid pressure means being supplied by fluid conduits 19 (see FIG. 2) extending to a fluid pressure source of supply (not shown.)

One of the complementary reciprocatable die jaws, as the jaw 18, is of standard construction and its rigid horizontal transverse bars 20 carry a resilient facing or pad 21 against which the flexible film material 12, between a pair of adjacent, connected bags, is adapted to be compressed when the pair of complementary die jaws 18 and 18' are reciprocated toward one another into abutment, as in FIGS. 4 and 5, for transverse sealing and cut-off operations.

The present improvements comprising the film sealing mechanism are incorporated in the other die jaw 18', as will appear from FIGS. 3, 4 and 5. for this purpose there are mounted in the forward portion of said die jaw 18', in laterally spaced apart relation, and to move with the fluid cylinder plate 29, a pair of mounting brackets 22 in which are rigidly mounted the opposite end portions of a pair of film pressure bars 23, the bars being disposed at an angle toward one another and converging toward the inner end of said die jaw with the forward noses of the same being flattened as at 23' (see FIG. 3). The mounting brackets 22, inwardly of the bars 23, are provided with grooves 24 (see FIG. 6), which grooves converge toward the inner or forward end of the brackets and have slidably mounted therein reciprocatable film cooling bars 25. Each film cooling bar 25 has pinned or otherwise secured to its inner face a rack bar 26 adapted to mesh with pinions 27 mounted fast on revoluble transverse horizontal shafts 28.

The numeral 30 generally indicates a horizontally disposed combination cut-off knife 14 and film heater which is extended between the mounting brackets 22 and has its opposite end edges mounted in slots 31 in said brackets for horizontal reciprocation relative thereto. Top and bottom face portions of the shank of said knife and film heater 30 are formed as rack bars 32 which mesh with the vertically spaced apart pinions 27. The cut-off knife blade 14, previously mentioned, projects forwardly from the nose portion of the member 30 and within said member 30, adjacent the knife blade and nose portion, there is an electric heater 33 supplied with electricity by current wires 34 extending to a source of electrical energy (not shown). It should also be observed that the cooling bars 25 have cooling fluid ducts 35 therein and into which a cooling fluid may be introduced and from which said fluid is withdrawn by tubes 51 which connect with a source of cooling fluid supply (not shown). Mounted on a suitable support 52 below the die assembly is a pivotal switch 36 which is activated through contact with the die jaw 18' which carries the sealing mechanism, when said die jaw is projected to its closed position as in FIGS. 4 and 5. The operation of said switch 36 serves to close an electrical circuit which activates an air cylinder 53, later to be described, whereby the heater unit 30 is moved into sealing position only when the die jaws 18 and 18' are fully and properly closed with no misplaced product between them.

It should be understood that the packaging machine with which the improved film sealing mechanism is incorporated operates in the usual manner. At timed intervals the die jaws 18 and 18' close upon the film or packaging material 12 therebetween and perform the end seal and cut-off operation. While the die jaws are closed they reciprocate downwardly to advance the bag forming material and to release the completed filled and sealed, severed bag therebelow which drops into a chute 37 for removal from the machine. Then the die jaws open and reciprocate upwardly for a new bite.

FIG. 3 illustrates the die jaws in open position and the corresponding position of the elements incorporated in one of the die jaws and constituting the improved film sealing mechanism. After the die jaws reciprocate toward one another to close on the film material, as in FIG. 4, the knife and heater unit 30 is projected by the pinions 27 in enagement with the rack 32 so as to assume a forward position between the spaced converging ends of the film pressure bars 23, the latter squeezing the film against the resilient pad 21 on the other die jaw 18. The heater 23 which is continuously energized through the circuit wires 34 heaters the thermoplastic film material so as to seal the plys thereof together, and the projected knife blade 14 performs the cut-off operation.

There is associated with the die jaw 18' an air cylinder 53 connected with a source of fluid pressure supply (not shown) by a pipe 54. The air cylinder piston 55 is connected to the rear end of the knife and heater member 30. Operation of the air cylinder 55 is timed and controlled by the switch 36 so that upon projection of the die jaw 18' to its forward position of FIG. 4, the air cylinder 53 will immediately function to project the knife and heater 30 to its forward operative position.

The peculiarity of the film material adapted to be used with the present sealing mechanism is that immediately upon being heated and sealed it should be cooled under pressure to prevent the sealed portion of the bag or film from wrinkling and to give it strength. Therefore, immediately following the position of the mechanism and operation shown in FIG. 5 the knife and heater 30 are retracted by the air cylinder 53 acting through the pinions 27 and rack 32, as in FIG. 5, and this movement of the pinions also serves to project forwardly, into the space between the noses of the converged ends of the pressure bars 23, the noses or forward ends of the cooling bars 25. In this position the noses of the cooling bars engage the film material immediately after the same was heated and sealed and this serves to immediately cool the sealed film material relative to its sealing temperature. This position of the parts attains while the draw bar and die assembly is reciprocated downwardly to advance the film material, following which the die jaws open. The relative opening movement of the die jaws 18 and 18' returns the elements of the film sealing mechanism to the retracted position of FIG. 3.

From the foregoing description it will be seen that the improved film sealing mechanism may be incorporated in a conventional automatic packaging machine which requires very little modification except that the special film sealing mechanism is incorporated in one of the die jaws. The film sealing mechanism operates automatically and expeditiously and it especially adapts the packaging machine to use with difficult plastic film materials such as polyethylene or the like.

The film sealing mechanism of the present invention permits much more rapid operation of the machine because immediately upon the closing operation of the dies the heat sealing action and cut-off takes place, followed rapidly by the retraction of the knife and heater and the simultaneous projection of the cooling bars which, being projected at an angle, give an ironing effect to the heated film while it is being rapidly cooled. This rapid cooling serves to strengthen the film seal prior to the retraction of the dies.

The mechanism is substantially maintenance-free and involves no complicated electrical circuits which might malfunction. Additionally, it should be pointed out that the knife and heating bar 30 cannot project and come into operative position if the die jaws are not completely closed, which might occur should a piece of the product being packaged become mispositioned. This eliminates any possible damage to the sealing mechanism by virtue of improper operation.

The improved packaging machine film sealing mechanism is of relatively simple construction, is strong and durable, is rapid and efficient in operation, and is well adapted for the purposes described.

What is claimed as the invention is:

1. In a packaging machine end seal die assemblage wherein a pair of complementary die jaws reciprocate from open to closed position and operate on package forming film material extended therebetween, the improvements which comprise: a film heat seal member reciprocatably mounted in one of the die jaws; a film cooling member reciprocatably mounted in the same die jaw; and means for projecting the heat seal member into film engaging position while the film cooling member is retracted and subsequently retracting the heat seal member and projecting the film cooling member into film engaging position.

2. In a packaging machine end seal die assemblage wherein a pair of complementary die jaws reciprocate from open to closed position, and vice versa, and operate on package forming film material extended therebetween, the improvements which comprise: a combined knife and film heat seal member independently reciprocatably mounted in one of the die jaws; a film cooling member reciprocatably mounted in the same die jaw; and means for projecting the knife and film heat seal member into film engaging position while the cooling member is retracted and subsequently retracting the knife and heat seal member while simultaneously projecting the film cooling member into film engaging position.

3. In a packaging machine end seal die assemblage wherein a pair of complementary die jaws reciprocate from open to closed position, and vice versa, and operate on package forming film material extended therebetween, the improvements which comprise: a film sealing and severing member independently reciprocatably mounted in one of the die jaws; a film cooling bar reciprocatably mounted in the same die jaw; and means operative while the die jaws are closed for projecting the film sealing and severing member into film engaging position while the cooling bar is retracted and immediately thereafter retracting the film sealing and severing member while projecting the cooling bar into film engaging position.

4. In a packaging machine end seal die assemblage wherein a pair of complementary die jaws reciprocate from open to closed position and operate on package forming film material extended therebetween, the improvements which comprise: a film heat sealing and severing member reciprocatably mounted in one of the die jaws; a film cooling member reciprocatably mounted in the same die jaw and movable in a path forming an angle to the path of movement of the film sealing and severing member; and means for projecting the heat sealing and severing member into film engaging position while the film cooling member is retracted and subsequently retracting the heat sealing and severing member and projecting the film cooling member into film engaging position.

5. In a packaging machine end seal die assemblage wherein a pair of complementary die jaws reciprocate from open to closed position and operate on package forming film material extended therebetween, the improvements which comprise: a film heat sealing and severing member reciprocatably mounted in one of the die jaws to move in a path at right angles to the extent of the film material; a film cooling member reciprocatably mounted in the same die jaw to move in a path forming an acute angle to the path of movement of the film sealing and severing member; and means for projecting the heat sealing and severing member into film engaging position while the film cooling member is retracted and simultaneously retracting the heat sealing and severing member and projecting the film cooling member into film engaging position.

6. In a packaging machine end seal die assemblage wherein a pair of complementary die jaws reciprocate from open to closed position, and vice versa, and operate on package forming film material extended therebetween, the improvements which comprise: a pair of spaced film cooling members arranged in inwardly converging relation and jointly reciprocatably mounted in one of the die jaws; a heat sealing and severing member reciprocatably mounted in the same die jaw intermediate said film cooling members; and means for projecting the heat sealing and severing member into film engaging position while the cooling members are retracted and subsequently retracting the heat sealing and severing member while simultaneously projecting both film cooling members into film engaging position.

7. In a packaging machine end seal die assemblage wherein a pair of complementary die jaws reciprocate from open to closed position and operate on package forming film material extended therebetween, the improvements which comprise: a film heat sealing and severing member reciprocatably mounted in one of the die jaws; a film cooling member reciprocatably mounted in the same die jaw and movable in a path forming an angle to the path of movement of the film sealing and severing member; and gear means for simultaneously projecting the heat sealing and severing member into film engaging position while the film cooling member is being retracted and subsequently retracting the heat sealing and severing member while the film cooling member is being projected into film engaging position.

8. In a packaging machine end seal die assemblage wherein a pair of complementary die jaws reciprocate from open to closed position and operate on package forming film material extended therebetween, the improvements which comprise: a film heat sealing and severing member reciprocatably mounted in one of the die jaws to move in a path at right angles to the extent of the film material; a film cooling member reciprocatably mounted in the same die jaw to move in a path forming an acute angle to the path of movement of the film sealing and severing member; means for reciprocating the heat sealing and severing member to and from film engaging position; and means actuated by movement of the heat sealing and severing member for simultaneously reversely reciprocating the film cooling member.

9. In a packaging machine end seal die assemblage wherein a pair of complementary die jaws reciprocate from open to closed position and operate on package forming film material extended therebetween, the improvements which comprise: a film heat sealing and severing member reciprocatably mounted in one of the die jaws; a film cooling member reciprocatably mounted in the same die jaw and movable in a path forming an angle to the path of movement of the film sealing and severing member; means for reciprocating the film sealing and severing member inwardly and outwardly; and reverse motion transmitting means interposed between the film sealing and severing member and the film cooling member for retracting the cooling member when the film sealing and severing member is projected and projecting the film cooling member into film engaging position when the film sealing and severing member is retracted.

10. In a packaging machine end seal die assemblage wherein a pair of complementary die jaws reciprocate from open to closed position, and vice versa, and operate on package forming film material extended therebetween, the improvements which comprise: a pair of spaced film cooling members arranged in inwardly converging relation and reciprocatably mounted in one of the die jaws; a heat sealing and severing member reciprocatably mounted in the same die jaw intermediate said film cooling members; means for projecting the heat sealing and severing member into film engaging position through the apex of the cooling members while they are retracted and subsequently retracting the heat sealing and severing member while simultaneously projecting both film cooling members into film engaging position.

11. In a packaging machine end seal die assemblage wherein a pair of complementary die jaws reciprocate from open to closed position, and vice versa, and operate on package forming film material extended therebetween, the improvements which comprise: a pair of angularly related film cooling members arranged in inwardly converging relation and reciprocatably mounted in one of the die jaws; a heat sealing and severing member reciprocatably mounted in the same die jaw intermediate said film cooling members in axial relation thereto; power means for projecting the heat sealing and severing member into film engaging position through the apex of the cooling members while they are retracted; and reverse operating gear means interposed between the heat sealing and severing member and both cooling members for automatically subsequently projecting both film cooling members into film engaging position when the heat sealing and severing member is retracted.

12. In combination, an end seal die jaw for a packaging machine; means for reciprocating said die jaw; a pair of spaced-apart, inwardly converging film clamping bars rigidly carried by said die jaw, a space being provided between the inner end portions of said clamping bars; a film cooling bar reciprocatably mounted in said die jaw adjacent the inner face of each clamping bar; a film sealing and severing member reciprocatatably mounted in said die jaw intermediate said film cooling bars; and means operative while said die jaw is in one position for projecting the film sealing and severing member into film engaging position through the space between the inner ends of the clamping bars while the cooling bars are retracted and immediately thereafter retracting the film sealing and severing member while projecting the cooling bars into film engaging position through the space between the inner ends of the clamping bars.

References Cited in the file of this patent

UNITED STATES PATENTS

| | | |
|---|---|---|
| 2,326,931 | Dalton et al. | Aug. 17, 1943 |
| 2,494,905 | Shumann | Jan. 17, 1950 |
| 2,698,273 | Miner et al. | Dec. 28, 1954 |
| 2,762,421 | Quinche et al. | Sept. 11, 1956 |